United States Patent

[11] 3,597,058

| [72] | Inventor | Joseph T. Nicosia<br>13 Hileen Drive, Kings Park, N.Y. 11754 |
|---|---|---|
| [21] | Appl. No. | 699,549 |
| [22] | Filed | Jan. 22, 1968 |
| [45] | Patented | Aug. 3, 1971 |

[54] CARTRIDGE TYPE MOTION PICTURE PROJECTOR
12 Claims, 11 Drawing Figs.

| [52] | U.S. Cl. | 352/72, 352/129 |
|---|---|---|
| [51] | Int. Cl. | G03b 23/02 |
| [50] | Field of Search | 352/72, 73, 78, 129, 149 |

[56] References Cited
UNITED STATES PATENTS

| 1,510,470 | 10/1924 | Dunlany | 352/129 (UX) |
|---|---|---|---|
| 1,953,986 | 4/1934 | Porter | 352/78 |
| 1,957,378 | 5/1934 | Zimmerman | 352/129 (UX) |
| 2,427,585 | 9/1947 | Williams | 352/78 |
| 2,211,218 | 8/1940 | Serrurier | 352/129 X |
| 3,402,982 | 9/1968 | Lemelson | 352/72 X |

*Primary Examiner*—Samuel S. Matthews
*Assistant Examiner*—Monroe H. Hayes
*Attorney*—Darby & Darby ABSTRACT: A cartridge type motion picture projector having a lens system, light source and drive motor as part of the projector housing. A cartridge containing the film and film drive mechanism is held to the projector housing with the light source in alignment with the film and the film gate aperture of the cartridge and the output shaft of the drive motor engaging the film drive mechanism of the cartridge. The film drive mechanism is of a simplified form including a pointed member which is shaped and driven to provide both reciprocating motion and a frame-by-frame advancement of the film. The lens system includes a light diffusing member which drops into position in the optical path when the projection is inverted so that it can function as a previewer.

INVENTOR
JOSEPH T. NICOSIA

BY Darby & Darby
ATTORNEYS

INVENTOR
JOSEPH T. NICOSIA

BY Darby & Darby

ATTORNEYS

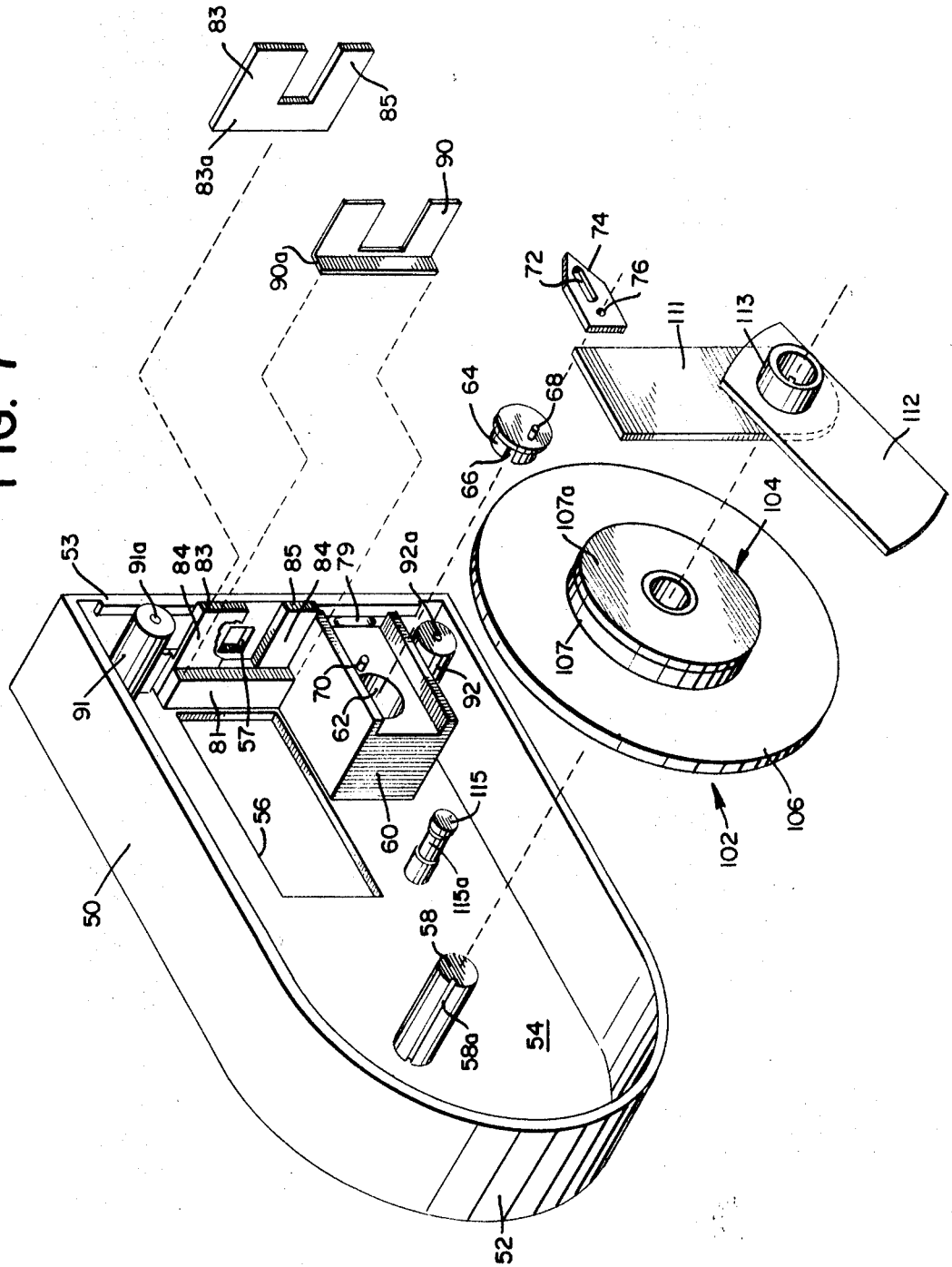

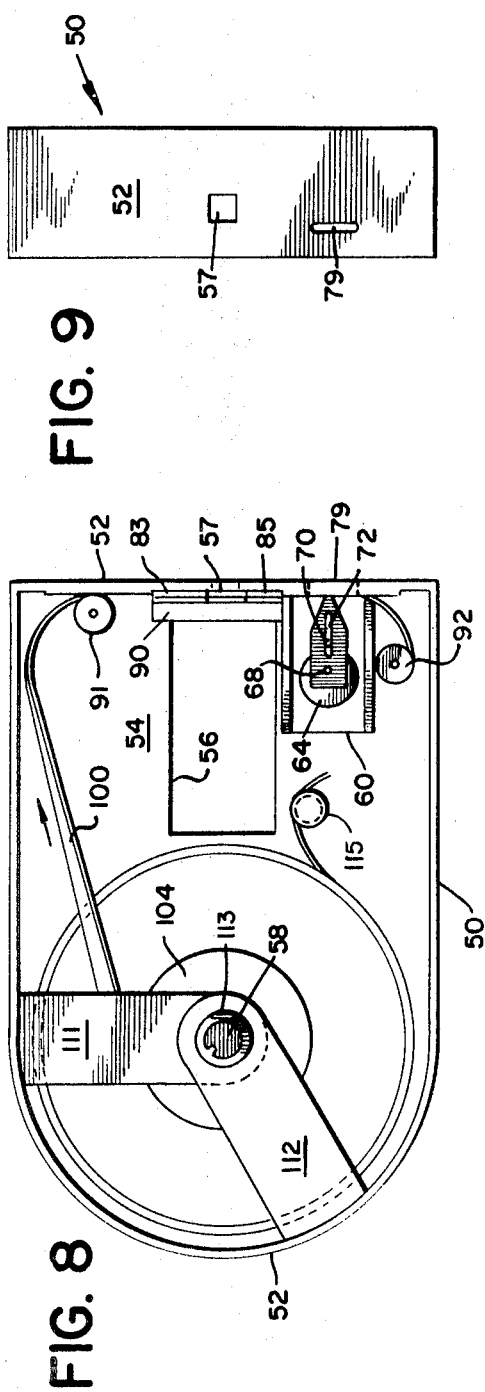
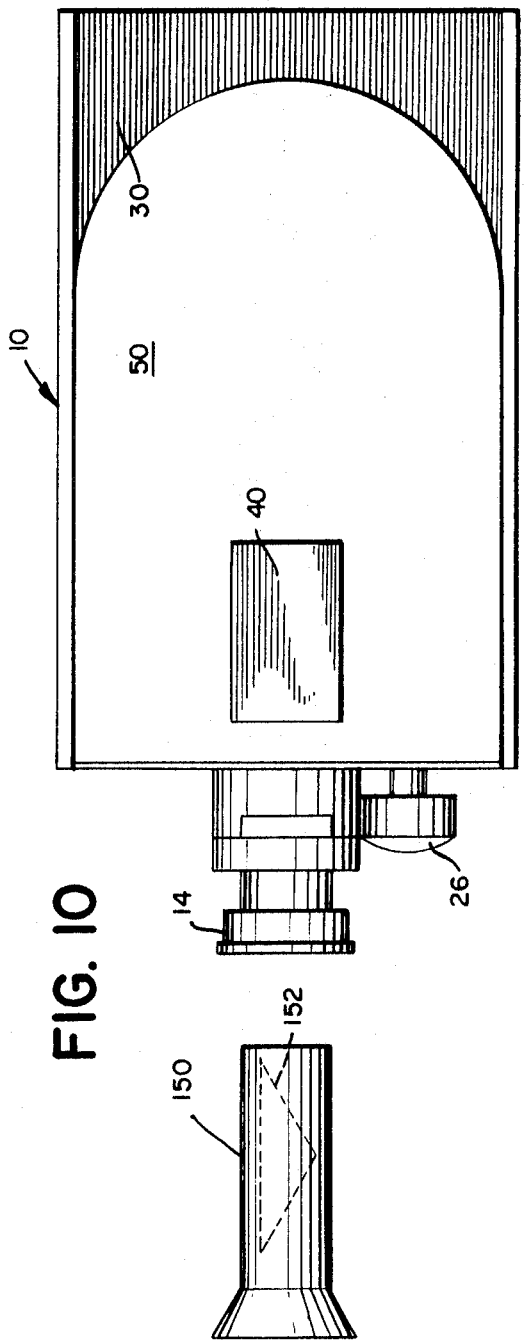

CARTRIDGE TYPE MOTION PICTURE PROJECTOR

This invention relates to a battery and/or AC operated motion picture projector which utilizes a novel film advance mechanism located in the cartridge and driven directly by the shaft of an electric motor. The projector of the present invention is designed to eliminate the necessity, as in conventional projectors, of providing gears, belt drives, sprockets, spring-tension film advance mechanisms. In the preferred embodiment of the invention, the film drive mechanism avoids the need for any optical or mechanical shutter, although one can be used, if desired.

The projector is further adapted to be used as a motion picture previewer in addition to its use as a projector in the conventional sense.

The projector of the present invention is used in conjunction with a film cartridge of novel design which eliminates the aforementioned conventional film drive and advance means by employing its own self-contained film advance mechanism. The film cartridge is preferably of the continuous loop type so as to eliminate any necessity for the operator's handling of the film in using the projector. The film cartridge is designed to contain, for example, 50 feet of film and may be used interchangeably with standard 8mm. film and Super 8mm. film without any changes or attachments to the projector being required. The cartridge is further designed to be in positive registration with respect to the film image aperture as a function of the self-contained film advance mechanism in the cartridge, making it independent of the projector for this function.

It is therefore an object of the present invention to provide a novel cartridge type projector in which the cartridge has a self-contained film advance mechanism.

Another object is to provide a cartridge type projector having a stationary lamp which aligns with the film gate and film aperture in the cartridge.

A further object is to provide a novel cartridge type projector having a self-contained drive mechanism in the cartridge which insures easy loading and operation of the projector.

An additional object is to provide a novel cartridge type projector in which a film advance mechanism in the cartridge engages the output shaft of a drive motor located on the projector housing.

Other objects and advantages of the present invention will become more apparent upon reference to the following specification and annexed drawings, in which:

FIG. 7 is an exploded perspective view of the cartridge;

FIG. 8 is a side elevational view of the cartridge with cover removed showing the assembled cartridge;

FIG. 9 is a front elevational view of the cartridge of FIG. 8; and

FIG. 10 is a side elevational view of the projector showing its use as a previewer.

Figure 1:
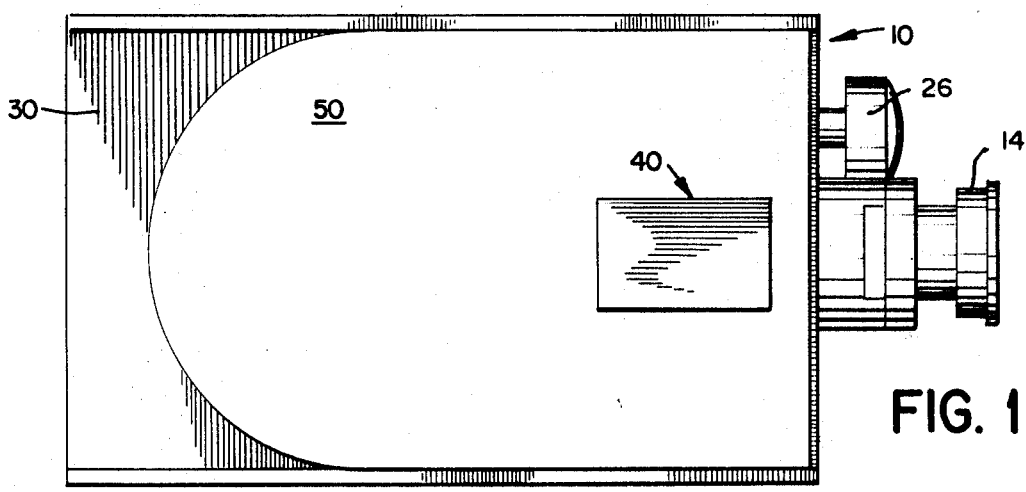
FIG. 1 is a side elevational view of the projector with cartridge assembled thereto.
Figure 2:
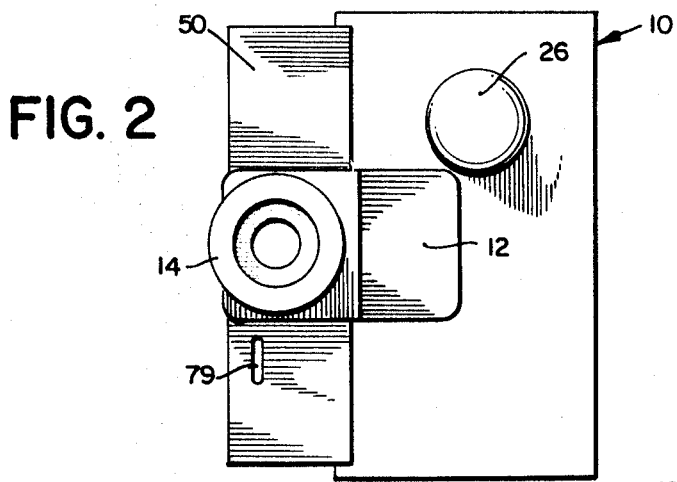
FIG. 2 is a front view of the assembled projector of FIG. 1.

Referring to FIGS. 1 and 2, the projector of the present invention is a two-part structure including a main projector housing 10 which holds the lamp, drive motor and power supply, and a cartridge 50 which is to be attached to the housing and held thereto by any suitable conventional means (not shown) such as magnetic catches, spring clips, latches, etc. As seen, the main housing 10 is of generally rectangular shape and a bracket 12 is secured to its front wall which holds a projection lens 14. The rear end of the projection lens 14 is slightly displaced away from the front of the main housing 10 to align with the film aperture of the cartridge, in a manner to be described below. The projection lens 14 is of any suitable conventional type and is preferably made adjustable so that the focus of the lens can be changed.

Figure 5:
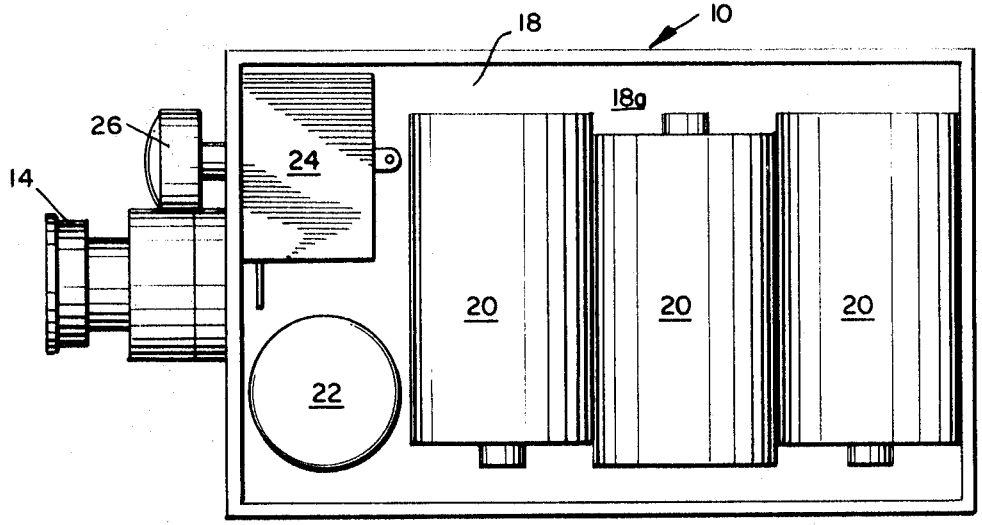
FIG. 5 is a side elevational view of the opposite side of the projector shown in FIG. 3 with the side of the housing removed showing the batteries and motor.

As shown in FIG. 5, a dividing wall 18 separates the housing 10 into two compartments, one numbered 18a for the motor and power supply (See FIG. 5) and the other 18b for the lamp. The divider member 18 is held to the housing by any suitable fasteners such as screws. The housing can also be a one-piece plastic molded structure. A plurality of batteries 20 which serve as the power supply for the projector are located in compartment 18a. Of course, a suitable AC-DC converter can be located in the space occupied by the batteries so that alternating current energy can be converted into direct current to operate the motor and lamp. The battery holders, which can be spring clips, are not shown for the sake of clarity.

A combined switch and rheostat control 24 is mounted on the front wall of housing 10. A control shaft and knob 26 extends forwardly of the housing to permit the operator to control the energization and the speed of the projector in a manner to be described below. A motor 22, which is of the variable speed, DC type, is also mounted on divider 18 with its output shaft extending into the compartment 18b on the opposite side of the divider. The wiring for the motor, batteries and control is not shown physically in the drawings but is shown schematically in FIG. 6 and is described in detail below.

Figure 3:
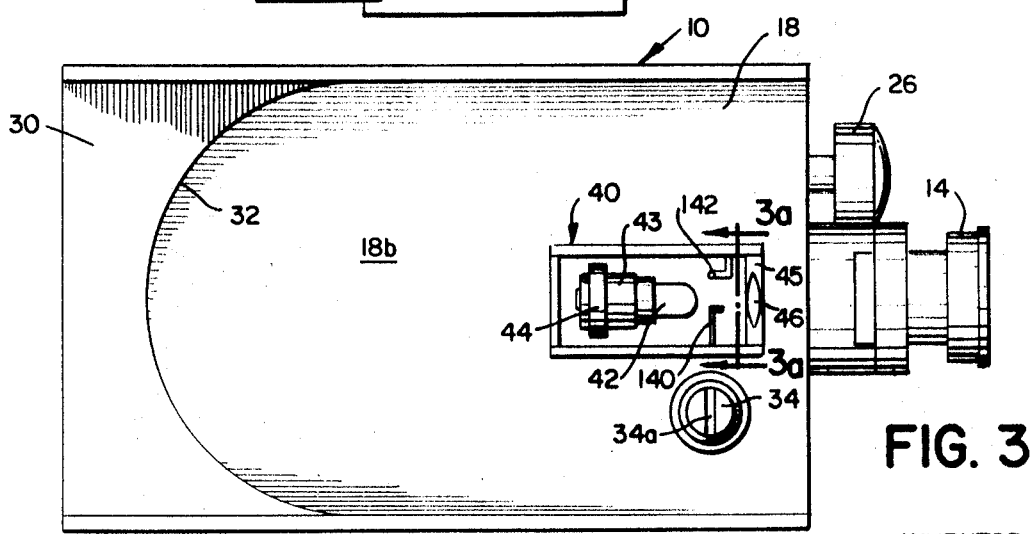
FIG. 3 is a side elevational view of the projector portion with cartridge removed and the cover off the lamp housing.

Referring now to FIG. 3, the side of the housing opposite from that shown in FIG. 5, is formed with a compartment 18b in the shape of the cartridge 50 and a partial cover or plate 30 which has an arcuate cutout 32 which conforms to the shape of the rear of the cartridge. It is desirable that the space between the cover plate 30 and the divider 18 of the housing be covered to prevent dirt or other material from getting into the housing. The drive shaft 34 of the motor 22 having a key 34a on its end, extends through divider 18 into compartment 18b for engagement with the film advance mechanism which is located in the cartridge, as described in detail below.

As shown in FIG. 3, a lamp housing 40 is located on the divider member 18 for holding a lamp 42 located in a socket 43 which is held on a suitable mounting bracket 44 fixed to the divider wall 18 or wall of housing 40. The cover plate for lamp housing 40, which is held thereto by screws, clips, etc., is not shown so that the internal components are visible. Lamp housing 40 has a front wall 45 with an aperture with a suitable condenser lens 46 therein to permit the light produced by the lamp 42 to pass therethrough. A space is left between the front wall 45 of the lamp housing 40 and the projector lens system 14. This space is adequate to accommodate the front of the cartridge in a manner to be described in greater detail below.

Figure 6:
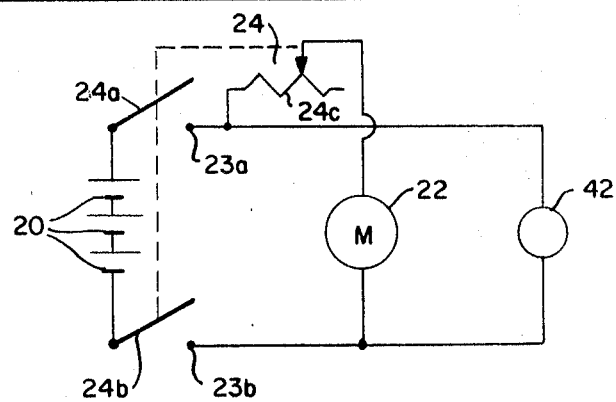
FIG. 6 is a schematic diagram of the motor control and lamp circuits.

Referring to FIG. 6, the circuit for the electrical operation of the projector is shown. Here, the three batteries 20 are connected in series to the switch contacts 24a and 24b of the control 24. The control 24 is a conventional switch which also has a rheostat 24c operated by the common, rotatable shaft member. When the control knob 26 is rotated, the switch contacts 24a and 24b make connection with the remainder of the circuit and resistance of the rheostat 24c can be adjusted by turning the knob 26.

The motor 22 is connected between the center arm of rheostat 24c and the lower terminal 23b of the circuit and one end of the rheostat is connected to the circuit terminal 23a. The lamp 42 is connected across terminals 23a and 23b. In operation, rotating the control knob 26, closes the circuit so that both the motor 22 and the light source 42 are energized. By turning the knob 26, the amount of voltage supplied to the motor 22 is changed, so that the speed of the motor is varied. Thus, as should be clear, the projector can be easily turned on and off, and the speed of the film advance varied, by an operator Referring to FIGS. 7—9, the details of the film cartridge 50 are shown. The rear end 52 of the cartridge is shaped to conform to the arcuate cutout 32 in the cover member 30 of the projector housing. The front wall 53 of the cartridge is flat and conforms to the front of the projector to be substantially flush therewith.

Cartridge housing 50 has a sidewall 54 which is formed with a cutout 56 of a size and shape suitable to accommodate the entire lamp housing 40, so that the housing 40 can protrude therethrough into the cartridge. A fixed shaft, or spindle, 58 is also mounted on the sidewall 54 for holding a film spool in a manner to be described in detail below. The front wall 53 has an aperture 57 therein which aligns with the aperture 45 of the light source housing and the center of the lens system 14 when the cartridge is properly placed in the projector housing 10 and held therein.

The film advance mechanism includes a base member 60 of generally rectangular shape mounted on the cartridge sidewall 54. The base member has a hole 62 in which a rotating film advance disc 64 is placed. The film advance disc 64 has a transverse slot 66 formed on its headed rear portion to engage the key 34a of the motor drive shaft. The shouldered side of the film advance disc 60 has an eccentrically located drive pin 68 mounted thereon.

Also mounted on the wall of the base member 60 is a fixed pin 70 which rides in a slot 72 formed in the front portion of a claw member 74. The claw 74 has a triangular front end and a hole 76 in which the disc drive pin 68 rides for driving the claw. The front wall 52 of the cartridge has an opening 79 to accommodate the nose of the claw 72.

A pair of guide members 83 and 85, connected by a center member 83a, are fastened to the inside of the cartridge front wall 53 above and below the aperture 57. The guide members 83 and 85 have curved depressions 84 therein to better conform to the shape of the film and to make it easier to advance the same. A lateral film guide member 81 is held on top of the center leg 83a of the guide members 83 and 85.

The film gate is formed between the curved faces of the guide members 83 and 85 and a clip or presser plate 90, of resilient material whose shape generally conforms to that of the guide members 83, 83a and 85. The clip 90 is fastened by a lip 90a to the lateral guide piece 81 on the side of the wall 54. The film rides between the clip 90 and the two guide members 83 and 85. The film gate serves to align the film and also to exert a small amount of pressure to avoid film backup. A pair of rollers 91 and 92 are mounted for rotation on suitable shafts 91a and 92a adjacent the top and bottom walls of the cartridge near the front wall 53.

Referring to FIGS. 7 and 8, the film spool 102 has a central hub 104 formed with a larger diameter outer flange 106. The central hub has a reduced diameter inner portion 107 so that the film does not contact the hub over the entire hub width but instead, rests only on the larger diameter portion 107a of the hub. The total width of the hub 104 is less than the width of film to be used. For example, with standard 8mm. film, the total width of the hub 104 would be ¼ inch with reduced diameter portion 107 being three-sixteenth inch and larger diameter portion 107a being one-sixteenth inch.

A double plate assembly 110 is used to aid in winding and unwinding the film 100 from the spool. The assembly 100 includes a first separator plate 111 and a second film constraining plate 112. Both of the plates are mounted on a common collar 113. The collar 113 is slipped over the spindle shaft 58. Collar 113 is internally keyed by member 113a to mate with a slot 58a running longitudinally along the surface of spindle shaft 58 to prevent assembly 110 from rotating about spindle shaft 58. Collar 113 is made to a predetermined length which when its outer end (farthest away from the film spool) is flush with the outer end of spindle 58, there is sufficient clearance between the inner end of collar 113 and the outer face of hub 104 so that hub 104 may rotate freely on spindle 58. Both plates are made of a suitable thin material, such as plastic.

The main coil of film 100 is wound on the outer flange 106 of the spool 102. Where 8mm. film is used, the thickness of the flange 106 can be, for example, one thirty-second inch. As seen in FIG. 8, the film on the central hub 104 comes off in a gentle curve outside of the separator plate 111. The separator plate 111, which is between the coil of film on the flange 106 and the film as it exits from hub 104, prevents the exiting film from coming into contact with the film coil on flange 106. With the projector operating the coil of film on flange 106 is rotating clockwise and downward at that point where the film travels toward the front of the cartridge. The inner surface of plate 111 also serves to prevent the film from falling away off the spool and to contain it in a proper gathering configuration. The film then passes over roller 91 into the film gate between the presser plate 90 and the guides 83 and 85, under the claw advance mechanism 74. The film next passes under roller 92, which is below the film gate, and over a roller 115 where it is wound on the outside of the coil on the outer flange 106 of the spool. The plate 111, which is on the outside of the film coil on the flange 106, serves to keep the film on the spool and further to constrain the film to exit from the center of the film spool at the point of least resistance.

During operation the bottom layer of the coil on flange 106 moves onto the hub 104 and then off the hub to the film gate. As the spool 102 rotates on the stationary spindle shaft due to pulling of the film by the claw, the film 100 on the feed spool hub 104 feeds from the center of the continuous loop and rewinds on the outer diameter of the continuous loop after passing through the film gate, image aperture and film advance mechanism, all of which are located at the front-forward portion of the cartridge 50.

The roller 115 upwardly supports the bulk of the film loop coming out of the film gate so that as the film is wound around the coil on flange 106 it does not rub against the inner surface of the cartridge wall. The roller 115 is preferably undercut, such as shown at 115a, to constrain the sidewards motion of the film and to further direct it to gather at the proper point on the top of the coil on flange 106.

Considering now the operation of the projector, reference is made to FIGS. 3 and 8. The cartridge 50 of FIG. 8 is snapped into the projector housing of FIG. 3 so that the lamp housing 42 passes through the aperture 56 in the cartridge sidewall 54 and the film within the cartridge is aligned with the aperture mounted condenser lens 46 of the lamp housing. Correct alignment of the cartridge is assured due to the mating curved portions of the cartridge and the housing 32 and the lamp housing 40 passing through the cartridge sidewall 54. Of course, there is no need to touch the film since the film is already aligned in its own film gate within the cartridge 50. This means that the cartridge can be sealed so it can be made substantially tamper-proof.

As the cartridge is being assembled to projector housing 10, the keyed end 34a of the motor shaft engages the notch 66 (FIG. 7) of the drive disc 64 in the cartridge. As previously explained, the drive disc 64 has a drive pin 68 which engages the claw member 74. When the motor 22 is energized by operating the control 24, the motor turns the drive disc 64 to rotate the eccentrically mounted pin 68, thereby moving the claw up and down and also providing reciprocating movement. The nose of the claw 74 extends into the sprocket hole of the film 100 to thereby engage the film and move it downward one frame at a time. This moves the reel 102 to provide winding and unwinding of the film. The claw 74 is also pulled backward at the end of a stroke and forward as it slides with respect to the pin 70 to successively move into the next sprocket hole. The motion of the film is essentially continuous. However, the ratio of film dwell time (when the film is left stationary in front of the lamp 42 and the claw is being pulled back and raised) to film advance time (when the claw moves into a sprocket hole and pulls the film down) resembles that of a spring-snap action in view of the eccentric action of the claw member. This renders a high quality projected and/or previewed image which is smooth in continuity and free of any jitter.

It should be understood that as the claw 74 is retracted rearwardly, it travels along the stationary pin 70 which extends through its slot 74. The action of the eccentric pin on the rear of the claw imparts a cam and cam follower action which in turn causes the front end of the claw to insert itself through the sprocket hole in the film and advance the film one frame only. The claw retracts to repeat the cycle in each case. The slot 79 in the cartridge front wall limits the downward travel of the claw to advance the film only a single frame at a time so that there is no problem with contacting additional sprocket holes.

The projector of the present invention is essentially shutterless in that no shutter is used to block the film gate as the film is being advanced. It should be understood that a suitable shutter mechanism could be provided if desired. This shutter mechanism, for example, can be geared to the motor or the film advance mechanism in any desired manner.

As previously described, the projector operates to project an image through the lens system 14 onto a suitable viewing surface. FIG. 10 illustrates the use of the projector as a previewer, so that the film on the spool can be viewed by a single person.

Figure 3A:
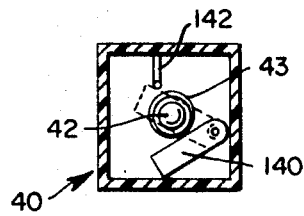
FIG. 3a is a front view of the lamp housing taken in section along lines 3a—3a of FIG. 3.
Figure 4:
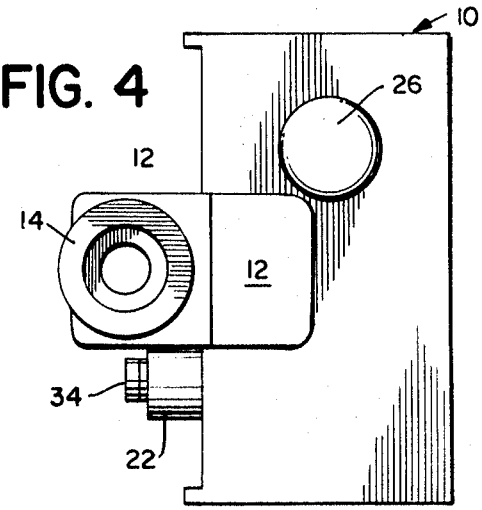
FIG. 4 is a front view of the projector with cartridge removed.

As shown in FIGS. 3 and 3a, a small vane 140 of translucent material is provided in the lamp housing 40 to diffuse the light emitting the lamp 42. The translucent vane is pivotally mounted and is positioned between the lamp 42 and the condenser lens 46 and is a part of the projector.

When the projector is used in the normal projection mode, the translucent vane 140, being pivoted at the end nearest the projector wall, remains, by gravity, below the light path of the lamp. When the projector is used in the preview mode it is turned upside down. This causes the translucent vane 140 to drop by gravity, and rest against a prefixed stop 142, in the center of the light path between the lamp and the condenser lens 46.

With the projector upside down, and the translucent vane in the diffuse position, the operator, by peering through the projector lens 14, or supplemental enlarging lens, sees the image as an upright, backlighted, transparency which is reversed in the horizontal plane only. To invert the image to its proper horizontal plane for previewing, a suitable eyepiece 150, containing a dove prism 152 is used in conjunction with the projector lens, or supplemental enlarging lens. The eyepiece 150 is preferably mechanically indexed to mate with the projector for the purpose of maintaining the dove prism in its proper rotated position relative to the viewed image.

While preferred embodiments of the invention have been described above, it will be understood that these are illustrative only, and the invention is to be limited solely by the appended claims.

I claim:

1. A cartridge type film projector comprising in combination a projector portion and a cartridge portion, said projector portion having a light source, a lens and a drive motor with an output shaft mounted thereon, said cartridge portion comprising means for holding film, and means within said cartridge portion engageable with and driven by said motor output shaft of said projector portion for both transporting the film from said holding means and advancing said film, said projector portion further comprising light diffusing means for location in the light output path of said light source, said light diffusing means comprising a vane of translucent material pivotally mounted to the projector wall at a point between said light source and said lens for movement by gravity into the projection path when the projector is inverted.

2. The film projector of claim 1 wherein said film advance mechanism in said cartridge comprises a claw, and means for moving said claw toward the film to engage the film adjacent a sprocket hole and advance it a frame at a time.

3. The film projector of claim 2 wherein said moving means also retracts the claw from the film after it has been advanced.

4. The film projector of claim 3 wherein said moving means comprises a drive disc having means thereon for engaging the motor output shaft to be driven thereby and a pin eccentrically mounted on said disc for engaging and moving the drive claw.

5. The film projector of claim 2 wherein said claw is formed with a pointed end for insertion into the film sprocket holes.

6. The film projector of claim 5 wherein said cartridge is formed with a slot in one of its walls into which said end of said claw extends to limit the movement of the claw.

7. The film projector of claim 2 wherein said film cartridge further comprises a film gate, means for holding said film in said film gate, and means for aligning the light source of the projector portion with said film gate.

8. The film projector of claim 4 wherein said claw is formed with a pointed end for insertion into the film sprocket holes.

9. The film projector of claim 1 for use as a previewer further comprising means for inverting the image produced by the projector.

10. The film projector of claim 1 wherein said projector portion includes a housing, an enclosure on said housing in which said light source is located, said enclosure having an opening through which the light from the light source exits, said cartridge portion also including a housing having a first opening in a wall thereof of generally complementary shape to said enclosure of said projector portion housing, said enclosure of said projector portion fitting within said first opening of said cartridge housing, said cartridge housing also having a second opening adjacent which the film hovels, said second opening aligned with respect to said opening of said enclosure of said projector portion to receive the light from the projector portion.

11. The film projector of claim 10 wherein said projector portion housing also has a third opening in line with said second opening through which the image from the film is projected.

12. The projector of claim 10 wherein said output shaft of said projector portion extends from the same side of the housing as the said enclosure containing the light source.